US012627103B2

(12) United States Patent
Lim et al.

(10) Patent No.: US 12,627,103 B2
(45) Date of Patent: May 12, 2026

(54) SHIELDED CONNECTOR ASSEMBLY

(71) Applicant: 3M INNOVATIVE PROPERTIES COMPANY, St. Paul, MN (US)

(72) Inventors: Chin Hua Lim, Mo Kio (SG); Saujit Bandhu, Sengkang (SG); YunLong Qiao, Bukit Timah (SG); Kok Hoe Lee, Geylang (SG); Siang Sin Foo, Serangoon (SG)

(73) Assignee: 3M Innovative Properties Company, St. Paul, MN (US)

( * ) Notice: Subject to any disclaimer, the term of this patent is extended or adjusted under 35 U.S.C. 154(b) by 291 days.

(21) Appl. No.: 18/284,594

(22) PCT Filed: Mar. 24, 2022

(86) PCT No.: PCT/IB2022/052705

§ 371 (c)(1),
(2) Date: Sep. 28, 2023

(87) PCT Pub. No.: WO2022/208247

PCT Pub. Date: Oct. 6, 2022

(65) Prior Publication Data

US 2024/0372301 A1 Nov. 7, 2024

Related U.S. Application Data

(60) Provisional application No. 63/200,786, filed on Mar. 29, 2021.

(51) Int. Cl.
*H01R 13/6583* (2011.01)
*H01R 12/70* (2011.01)
(Continued)

(52) U.S. Cl.
CPC ..... *H01R 13/6583* (2013.01); *H01R 12/7029* (2013.01); *H01R 12/732* (2013.01);
(Continued)

(58) Field of Classification Search
CPC ............ H01R 13/6583; H01R 13/6275; H01R 13/6335; H01R 13/6594; H01R 12/7029; H01R 12/732
(Continued)

(56) References Cited

U.S. PATENT DOCUMENTS 7,322,845 B2 * 1/2008 Regnier ............. H01R 13/6275 439/352
7,473,124 B1 * 1/2009 Briant .................. H01R 13/629 439/352

(Continued)

FOREIGN PATENT DOCUMENTS

| | | |
|---|---|---|
| CN | 201845958 U | 5/2011 |
| CN | 209747761 U | 12/2019 |
| WO | 2014021784 A1 | 2/2014 |

OTHER PUBLICATIONS

International Search Report received for PCT International Application No. PCT/IB2022/052705, mailed on Jun. 27, 2022, 4 pages.

*Primary Examiner* — Harshad C Patel
(74) *Attorney, Agent, or Firm* — Gregg H. Rosenblatt

(57) ABSTRACT

A connector assembly, configured to mate with a mating connector along a mating direction, includes a circuit board, at least one cable, an insulative housing, an electrically conductive unitary shield, a pull tab, and a retention feature. The cable includes a plurality of conductors having front ends terminated at conductive pads of the circuit board. The housing is tightly overmolded around at least a portion of the circuit board. A mating end of the circuit board extends forwardly from a mating face of the housing. The shield includes a top wall extending between a back end and a front end thereof. The pull tab is rotatably attached to the shield near a front end of a top wall of the shield. The retention feature of the shield engages a corresponding retention feature of the mating connector to prevent the connector assembly from unmating from the mating connector.

4 Claims, 16 Drawing Sheets

(51) Int. Cl.
*H01R 12/73* (2011.01)
*H01R 13/627* (2006.01)
*H01R 13/633* (2006.01)
*H01R 13/6594* (2011.01)

(52) U.S. Cl.
CPC ..... *H01R 13/6275* (2013.01); *H01R 13/6335* (2013.01); *H01R 13/6594* (2013.01)

(58) Field of Classification Search
USPC ...................................................... 439/607.01
See application file for complete search history.

(56) References Cited

U.S. PATENT DOCUMENTS

| | | | | |
|---|---|---|---|---|
| 7,507,103 | B1 * | 3/2009 | Phillips | H01R 13/6275 439/352 |
| 8,475,198 | B2 * | 7/2013 | Wu | H01R 13/6275 439/352 |
| 8,727,803 | B2 * | 5/2014 | Kurachi | H01R 13/639 439/497 |
| 8,858,240 | B2 * | 10/2014 | Wu | H01R 13/6658 439/607.45 |
| 8,905,777 | B2 * | 12/2014 | Zhu | H01R 13/62 439/352 |
| 9,385,472 | B2 * | 7/2016 | Yen | H01R 13/6275 |
| 9,768,534 | B2 * | 9/2017 | Kurachi | H01R 12/7005 |
| 10,263,349 | B2 * | 4/2019 | Phillips | H01R 12/7029 |
| 2010/0130063 | A1 * | 5/2010 | Lang | H01R 13/6593 439/607.17 |
| 2012/0329321 | A1 | 12/2012 | Scritzky et al. | |
| 2014/0322933 | A1 * | 10/2014 | Li | H01R 13/5845 439/76.1 |
| 2016/0104971 | A1 * | 4/2016 | Kurachi | H01R 13/62955 439/147 |
| 2019/0372251 | A1 | 12/2019 | Huang et al. | |
| 2021/0013651 | A1 | 1/2021 | Chi | |

* cited by examiner

SHIELDED CONNECTOR ASSEMBLY

CROSS REFERENCE TO RELATED APPLICATIONS

This application is a national stage filing under 35 U.S.C. 371 of PCT/IB2022/052705, filed Mar. 24, 2022, which claims the benefit of U.S. Provisional Application No. 63/200,786, filed Mar. 29, 2021, the disclosures of which are incorporated by reference in their entireties herein.

TECHNICAL FIELD

The present disclosure relates generally to a connector and a connector assembly, and in particular, to a connector and a connector assembly for mating with a mating connector.

BACKGROUND

A connector assembly is generally used to connect a cable from one device (e.g., a server, a network switching system, a client device, etc.) to another device (e.g., another server) for various applications, such as data processing, data transmission and data reception.

SUMMARY

In one aspect, the present disclosure provides a connector assembly configured to mate with a mating connector along a mating direction. The connector assembly includes a circuit board including a plurality of conductive front pads disposed on opposing major upper surfaces and lower surfaces of the circuit board at a mating end thereof. The circuit board further includes a plurality of conductive rear pads disposed on at least one of the major upper and lower surfaces of the circuit board at a cable end thereof opposite to the mating end. The rear pads are electrically connected to the front pads. The connector assembly further includes at least one cable including a plurality of conductors, front ends of which terminate at the rear pads. The connector assembly further includes an insulative housing tightly overmolded around at least the cable end of the circuit board, the front ends of the conductors, and the rear pads. The mating end of the circuit board extends forwardly from a mating face of the housing along the mating direction and is configured to be inserted into a front opening of the mating connector. The connector assembly further includes an electrically conductive unitary shield including a top wall extending between back and front ends thereof. The shield further includes a front wall extending downwardly from the front end of the top wall and opposing side walls extending downwardly from opposite side edges of the top wall. The shield is rotatably attached to the housing near the back end of the top wall and is configured to rotate about a laterally oriented first axis that passes through the housing behind the circuit board, between an open position and a closed position. The connector assembly further includes a pull tab rotatably attached to the shield near the front end of the top wall and configured to rotate about a laterally oriented second axis substantially parallel to the first axis. The connector assembly is configured to mate with the mating connector when the shield is in the open position. When the connector assembly is fully mated with the mating connector, the shield is configured to rotate from the open position to the closed position. The rotation of the shield from the open position to the closed position results in the top wall covering and shielding the housing, the circuit board, and the mating connector. The rotation of the shield from the open position to the closed position further results in the front wall being disposed at, and covering and shielding at least a portion of, a back side of the mating connector. The rotation of the shield from the open position to the closed position further results in the opposing side walls being disposed at, and covering and shielding at least portions of, opposing sides of the mating connector. The rotation of the shield from the open position to the closed position further results in a retention feature of the shield engaging a corresponding retention feature of the mating connector to prevent the connector assembly from unmating from the mating connector.

In another aspect, the present disclosure provides a connector configured to mate with a mating connector along a mating direction. The mating connector includes a mating insulative housing including a mating side defining a front opening therein. The mating insulative housing further includes an opposite back side, and opposing lateral sides extending between and connecting the mating and back sides. The connector includes a circuit board including a plurality of conductive pads. The connector further includes an insulative housing tightly overmolded around at least a portion of the circuit board. A mating end of the circuit board extends forwardly from a mating face of the housing along the mating direction and configured to be inserted into the front opening of the mating side of the mating insulative housing. The connector further includes an electrically conductive unitary shield including opposing side wings rotatably attached to corresponding lateral sides and near a rear face, opposite the mating face, of the housing. The shield is configured to rotate about a laterally oriented first axis that passes through the side wings between an open position and a closed position. Upon a full mating between the connector and the mating connector, the shield is configured to rotate from the open position to the closed position so that the shield covers substantially entire top and lateral sides, and at least a portion of the back side, of the mating insulative housing, and opposing retention features of the shield engage corresponding retention features of the mating connector on opposite lateral sides of the mating connector to prevent the connector from unmating from the mating connector.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

DETAILED DESCRIPTION

Figure 1B:
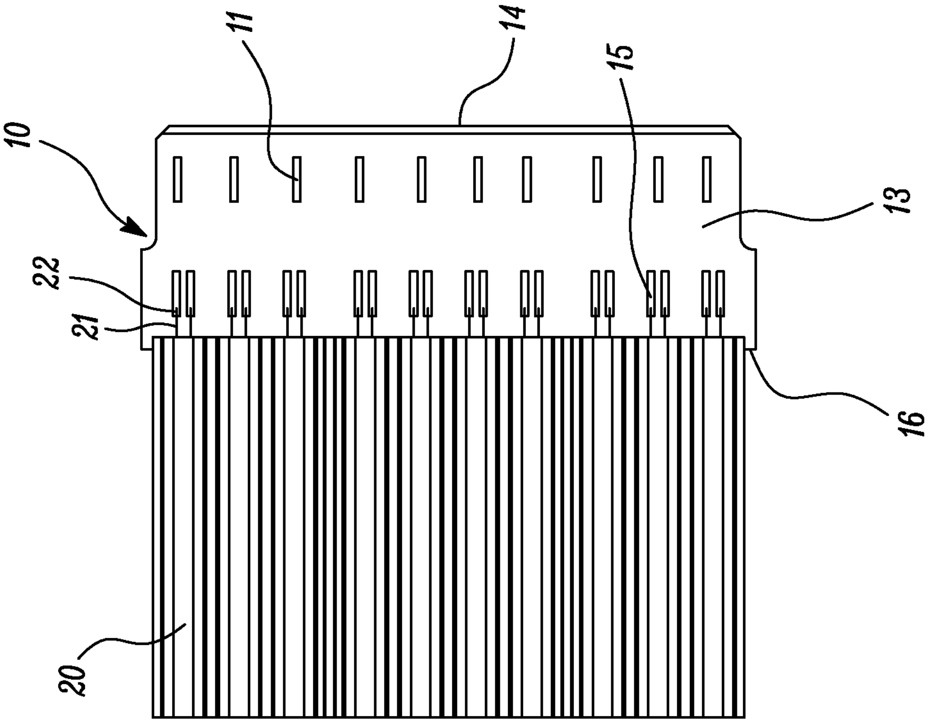
FIG. 1B is a schematic bottom view of the circuit board according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As recited herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

Terms such as same, equal, uniform, constant, strictly, and the like, are understood to be within the usual tolerances or measuring error applicable to the particular circumstance rather than requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

Expansion of data processing and data storage requirements typically causes an increasing demand for facilities (e.g., server rooms) to accommodate growing numbers of servers and supporting equipment. This demand may lead to an emphasis on physical space conservation in the facilities to accommodate more servers and supportive equipment. One or more connector assembly components typically need to conform to applicable industry standards. Further, in some cases, a heat sink may be disposed near conventional connector assemblies. Generally, conventional connector assemblies cannot be arranged below the heat sink which limits utilization of available space. Current or conventional connector assemblies may not support high-speed data processing and data storage functions as required by next generation database servers.

The present disclosure provides a connector assembly configured to mate with a mating connector along a mating direction. The connector assembly includes a circuit board including a plurality of conductive front pads disposed on opposing major upper surfaces and lower surfaces of the circuit board at a mating end thereof. The circuit board further includes a plurality of conductive rear pads disposed on at least one of the major upper and lower surfaces of the circuit board at a cable end thereof opposite to the mating end. The rear pads are electrically connected to the front pads. The connector assembly further includes at least one cable including a plurality of conductors, front ends of which terminate at the rear pads. The connector assembly further includes an insulative housing tightly overmolded around at least the cable end of the circuit board, the front ends of the conductors, and the rear pads. The mating end of the circuit board extends forwardly from a mating face of the housing along the mating direction and is configured to be inserted into a front opening of the mating connector. The connector assembly further includes an electrically conductive unitary shield including a top wall extending between back and front ends thereof. The shield further includes a front wall extending downwardly from the front end of the top wall and opposing side walls extending downwardly from opposite side edges of the top wall. The shield is rotatably attached to the housing near the back end of the top wall and is configured to rotate about a laterally oriented first axis that passes through the housing behind the circuit board, between an open position and a closed position. The connector assembly further includes a pull tab rotatably attached to the shield near the front end of the top wall and configured to rotate about a laterally oriented second axis substantially parallel to the first axis. The connector assembly is configured to mate with the mating connector when the shield is in the open position. When the connector assembly is fully mated with the mating connector, the shield is configured to rotate from the open position to the closed position. The rotation of the shield from the open position to the closed position results in the top wall covering and shielding the insulative housing, the circuit board, and the mating connector. The rotation of the shield from the open position to the closed position further results in the front wall being disposed at, and covering and shielding at least a portion of, a back side of the mating connector. The rotation of the shield from the open position to the closed position further results in the opposing side walls being disposed at, and covering and shielding at least portions of, the opposing sides of the mating connector. The rotation of the shield from the open position to the closed position further results in a retention feature of the shield engaging a corresponding retention feature of the mating connector to prevent the connector assembly from unmating from the mating connector.

The connector assembly of the present disclosure may have a low profile. Implying that the connector assembly of the present disclosure possesses a reduced thickness, breadth/width, length, surface area, and/or potential volume than those of conventional connector assemblies. For example, an integration of the housing and the shield in the connector assembly may result in the low profile of the connector assembly. Therefore, the connector assembly may require less physical space than conventional connector assemblies. Further, the connector assembly may be accommodated in available space that is/was not utilized in conventional connector assemblies, such as below heat sinks. In some cases, the mating connector may be mounted on a circuit board, within the available space between a heat sink and the circuit board. The connector assembly may further allow easy connection of the at least one cable with a mating connector associated with a device or a server (e.g., 1U rack server, blade server, GPU server, etc.). Further, the mating connection between the connector assembly and the mating connector may provide electromagnetic shielding from external devices.

Moreover, the connector assembly of the present disclosure may prevent accidental disconnection of the mating connector. An undesirable relative movement between the connector assembly and the mating connector in the fully mated state may also be prevented to ensure seamless connectivity between the connector assembly and the mating connector. The connector assembly may also be easily mated with the mating connector.

Figure 1A:
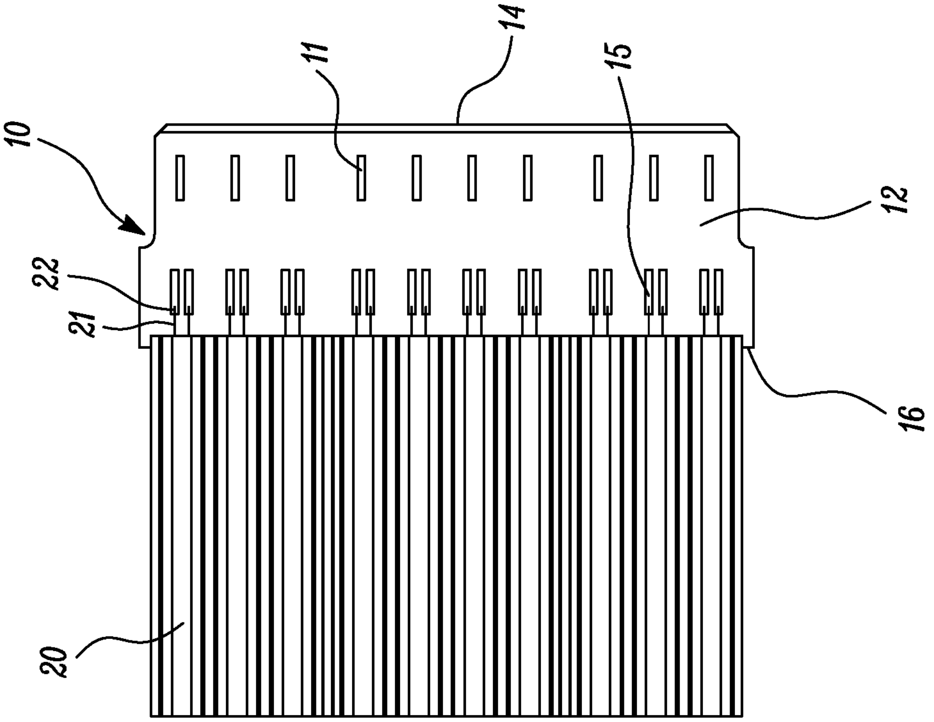
FIG. 1A is a schematic top view of a circuit board according to an embodiment of the present disclosure.

Referring to Figures, FIGS. 1A and 1B illustrate a top view and a bottom view, respectively, of a circuit board 10, according to an embodiment of the present disclosure. The circuit board 10 includes a plurality of conductive front pads 11 (interchangeably referred to as "the front pads 11") and a plurality of conductive rear pads 15 (interchangeably referred to as "the rear pads 15"). The front pads 11 and the rear pads 15 may be collectively referred to as a plurality of conductive pads 11, 15. The front pads 11 are disposed on opposing major upper and lower surfaces 12, 13 of the circuit board 10 at a mating end 14 thereof. The rear pads 15 are disposed on at least one of the major upper and lower surfaces 12, 13 of the circuit board 10 at a cable end 16 thereof opposite the mating end 14. The rear pads 15 are electrically connected to the front pads 11.

In the illustrated embodiment of FIGS. 1A and 1B, the front pads 11 and the rear pads 15 have a substantially rectangular shape. However, in some other embodiments, the front pads 11 and the rear pads 15 may have any suitable shape, such as square, curved, triangular, polygonal, circular, elliptical, oval, and so forth, based on the desired application attributes. Further, the front pads 11 may include an electrically conductive material, such as a metal or an alloy. Similarly, the rear pads 15 may be made of an electrically conductive material, such as a metal or an alloy. The front pads 11 and the rear pads 15 may have a similar configuration or have different configurations.

In some embodiments, the circuit board 10 may be a printed circuit board (PCB). In some embodiments, the circuit board 10 may further include other conductive features. In some embodiments, the other conductive features may be made of a metal or an alloy, such as copper. The other conductive features may be disposed on at least one of the major upper and lower surfaces 12, 13 of the circuit board 10. In some embodiments, the front pads 11 and the rear pads 15 and the other conductive features may be disposed on a non-conductive substrate. In some embodiments, the non-conductive substrate may be made of a polymeric resin.

In the illustrated embodiment of FIGS. 1A and 1B, each of the major upper surface 12 and the major lower surface 13 is substantially planar. Further, the major upper surface 12 and the major lower surface 13 are substantially parallel to each other. However, in some other embodiments, at least one of the major upper surface 12 and the major lower surface 13 may be curved.

FIGS. 1A and 1B further illustrate at least one cable 20 according to an embodiment of the present disclosure. The at least one cable 20 includes a plurality of conductors 21 having front ends 22 terminated at the rear pads 15. In some embodiments, the at least one cable 20 may include a shielded flat electric cable. Further, the at least one cable 20 may include multiple segments. In some embodiments, the at least one cable 20 may include a network cable, for example, an ethernet cable. In some embodiments, a total number of the plurality of conductors 21 of the at least one cable 20 may be varied as per desired application attributes.

Figure 2B:
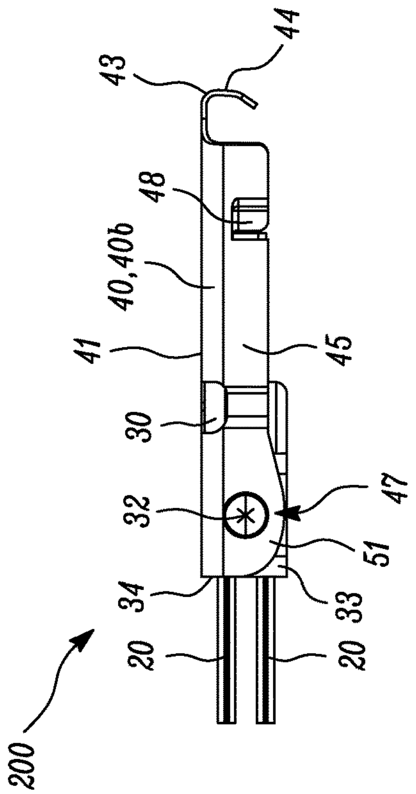
FIG. 2B is a schematic side view of the connector assembly according to an embodiment of the present disclosure.
Figure 2A:
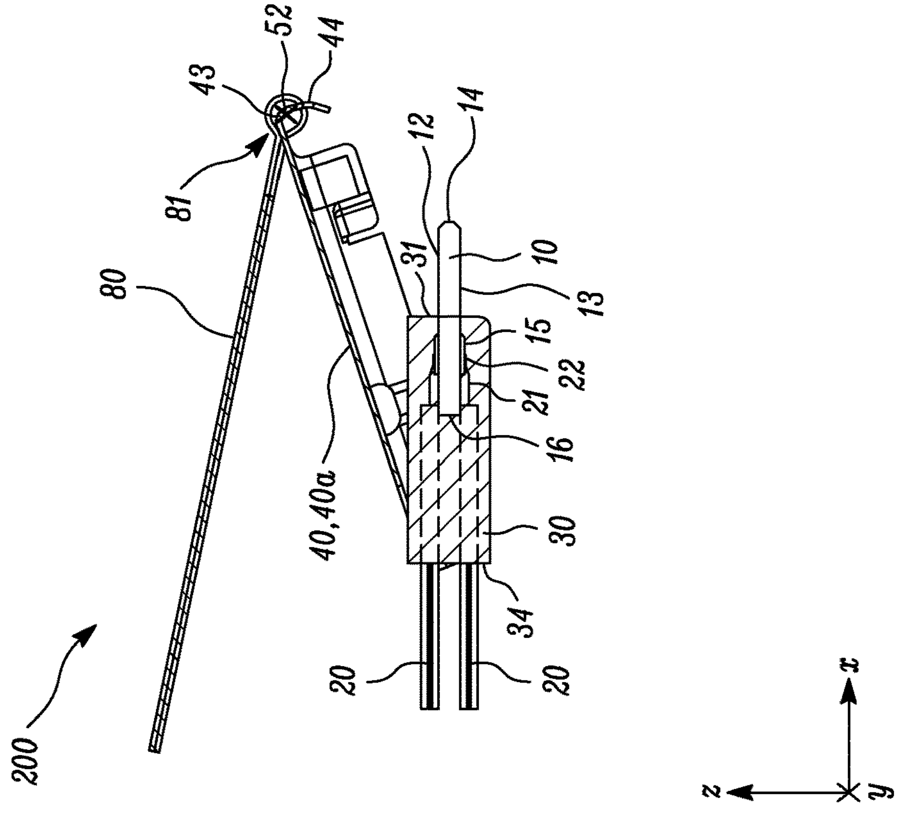
FIG. 2A is a schematic cross-sectional view of a connector assembly according to an embodiment of the present disclosure.
Figure 2C:
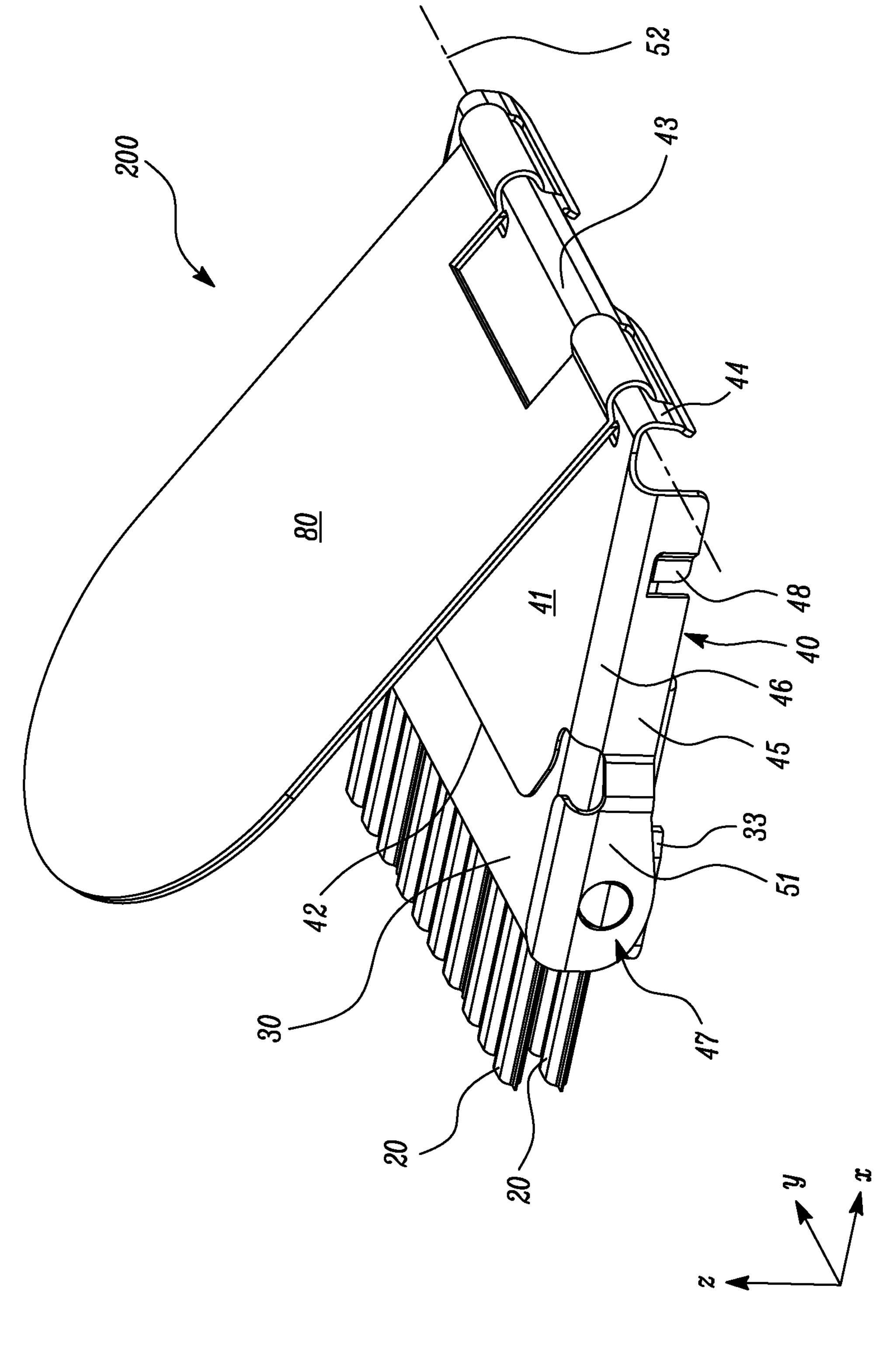
FIG. 2C is a schematic side perspective view of the connector assembly according to an embodiment of the present disclosure.
Figure 2D:
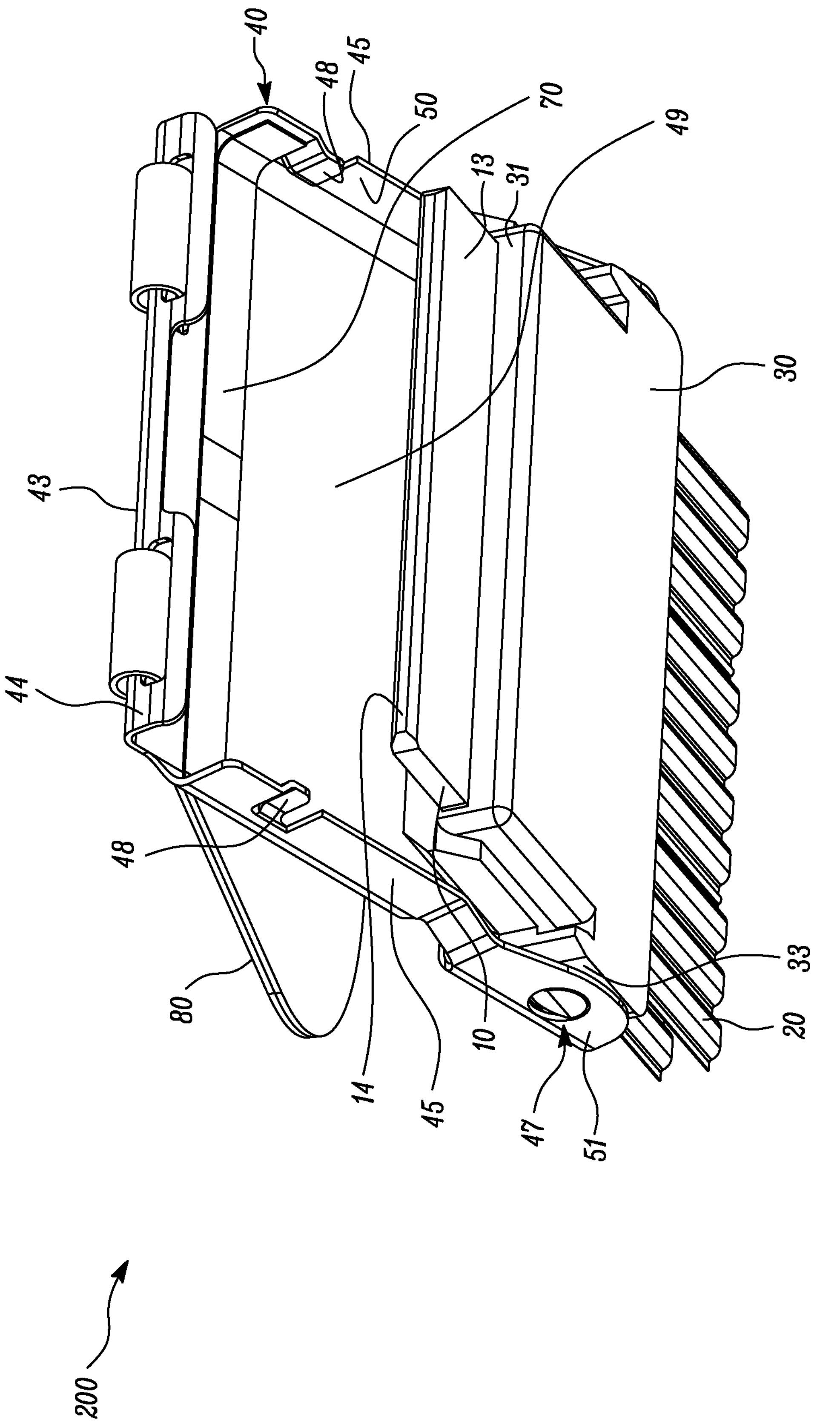
FIG. 2D is a schematic bottom perspective view of the connector assembly according to an embodiment of the present disclosure.

FIGS. 2A to 2D illustrate a connector assembly 200 (interchangeably referred to as "the connector 200") according to an embodiment of the present disclosure. Specifically, FIG. 2A illustrates a cross-sectional view of the connector assembly 200, FIG. 2B illustrates a side view of the connector assembly 200, FIG. 2C illustrates a top perspective view of the connector assembly 200, and FIG. 2D illustrates a bottom perspective view of the connector assembly 200.

The connector assembly 200 defines mutually orthogonal x, y, and z-axes. The x-axis is defined along a length of the connector assembly 200, while the y-axis is defined along a breadth of the connector assembly 200. The z-axis is defined along a thickness of the connector assembly 200.

The connector assembly 200 is configured to mate with a mating connector 300 (shown in FIGS. 6A-6B) along a mating direction. In the illustrated embodiment of FIG. 2, the mating direction is along the x-axis.

The connector assembly 200 includes the circuit board 10 and the at least one cable 20. In some embodiments, each of the major upper and lower surfaces 12, 13 of the circuit board 10 may be substantially located in the x-y plane of the connector assembly 200.

In the illustrated embodiment, the at least one cable 20 includes two cables 20 spaced apart from each other. The conductors 21 of one cable 20 may be terminated at the respective rear pads 15 disposed on the major upper surface 12 of the circuit board 10, while the conductors 21 of the other cable 20 may be terminated at the respective rear pads 15 disposed on the major lower surface 13 of the circuit board 10. However, any number of the cables 20 may be coupled to the circuit board 10 as per desired application attributes.

The connector assembly 200 further includes an insulative housing 30 (interchangeably referred to as "the housing 30") tightly overmolded around at least a portion of the circuit board 10. Specifically, the housing 30 is tightly overmolded around at least the cable end 16 of the circuit board 10, the front ends 22 of the plurality of conductors 21, and the rear pads 15. The mating end 14 of the circuit board 10 extends forwardly from a mating face 31 of the housing 30 along the mating direction. In other words, the mating end 14 of the circuit board 10 extends forwardly from the mating face 31 of the housing 30 along the x-axis. In the illustrated embodiment of FIGS. 2A-2D, the housing 30 has a generally rectangular shape. However, in some other embodiments, the housing 30 may have any suitable shape as per desired applications attributes. Further, the housing 30 may be made of any suitable material, such as a composite, a plastic, a dielectric material, and so forth.

The connector assembly 200 further includes an electrically conductive unitary shield 40 (interchangeably referred to as "the shield 40"). The shield 40 includes a top wall 41 extending between back and front ends 42, 43 thereof. The shield 40 further includes a front wall 44 extending downwardly from the front end 43 of the top wall 41. The shield 40 further includes opposing side walls 45 extending downwardly from opposite side edges 46 of the top wall 41. The shield 40 further includes opposing side wings 51. The side wings 51 extend backwardly from the side walls 45. The shield 40 further includes a retention feature 48. In some embodiments, each side wall 45 of the shield 40 includes the retention feature 48.

The shield 40 is rotatably attached 47 (interchangeably referred to as "the rotatable attachment 47") to the housing 30 near the back end 42 of the top wall 41. Specifically, the side wings 51 are rotatably attached 47 to corresponding lateral sides 33 and near a rear face 34, opposite the mating face 31 of the housing 30.

The shield 40 is configured to rotate about a laterally oriented first axis 32 that passes through the housing 30 behind the circuit board 10. The laterally oriented first axis 32 further passes through the side wings 51. In some embodiments, the laterally oriented first axis 32 is substantially along the y-axis.

The shield 40 is configured to rotate about the laterally oriented first axis 32 between an open position **40*a* and a closed position 40*b*. In the illustrated embodiment of FIG. 2A, the shield 40 is in the open position 40*a*. In the illustrated embodiment of FIG. 2B, the shield 40 is in the closed position 40*b***.

In the illustrated embodiment of FIGS. 2A, 2C, and 2D, the connector assembly 200 further includes a pull tab 80. The pull tab 80 is rotatably attached 81 (interchangeably referred to as "the rotatable attachment 81") to the shield 40 near the front end 43 of the top wall 41. The pull tab 80 is configured to rotate about a laterally oriented second axis 52 substantially parallel to the first axis 32.

In the illustrated embodiment of FIG. 2D, the connector assembly 200 further includes an electrically conductive strip 70 (interchangeably referred to as "the conductive strip 70") bonded to a bottom surface 49 of the top wall 41 of the shield 40 near the front end 43 of the top wall 41 (shown in FIG. 2B). The conductive strip 70 extends laterally across the bottom surface 49 and further extends downwardly along an inside surface 50 of each of the opposing side walls 45. The conductive strip 70 may provide electromagnetic shielding. In some embodiments, the conductive strip 70 may be capable of substantially suppressing (e.g., substantially reflecting and/or absorbing) electromagnetic radiation or interference from external sources. In some embodiments, the conductive strip 70 may include, but not limited to, a metallic ink or a sheet metal component. In some embodiments, the conductive strip 70 may be include a metal including, but not limited to, tin, nickel, silver, steel, brass, etc. In an example, the conductive strip 70 may include copper. In some embodiments, the conductive strip 70 may be bonded to the bottom surface 49 by an adhesive. In some other embodiments, the conductive strip 70 may be bonded to the bottom surface 49 by opposing retention elements (not shown). In some embodiments, each of the retention elements may be formed at corresponding opposing side walls 45. In an example, the conductive strip 70 may be bonded to the bottom surface 49 by using a combination of the adhesive and the opposing retention elements.

In some embodiments, the connector assembly 200 may conform to the Octal Small Format Pluggable (OSFP) form factor defined by an industry standard created by a committee known as an MSA (Multi-Source Agreement).

Figure 3:
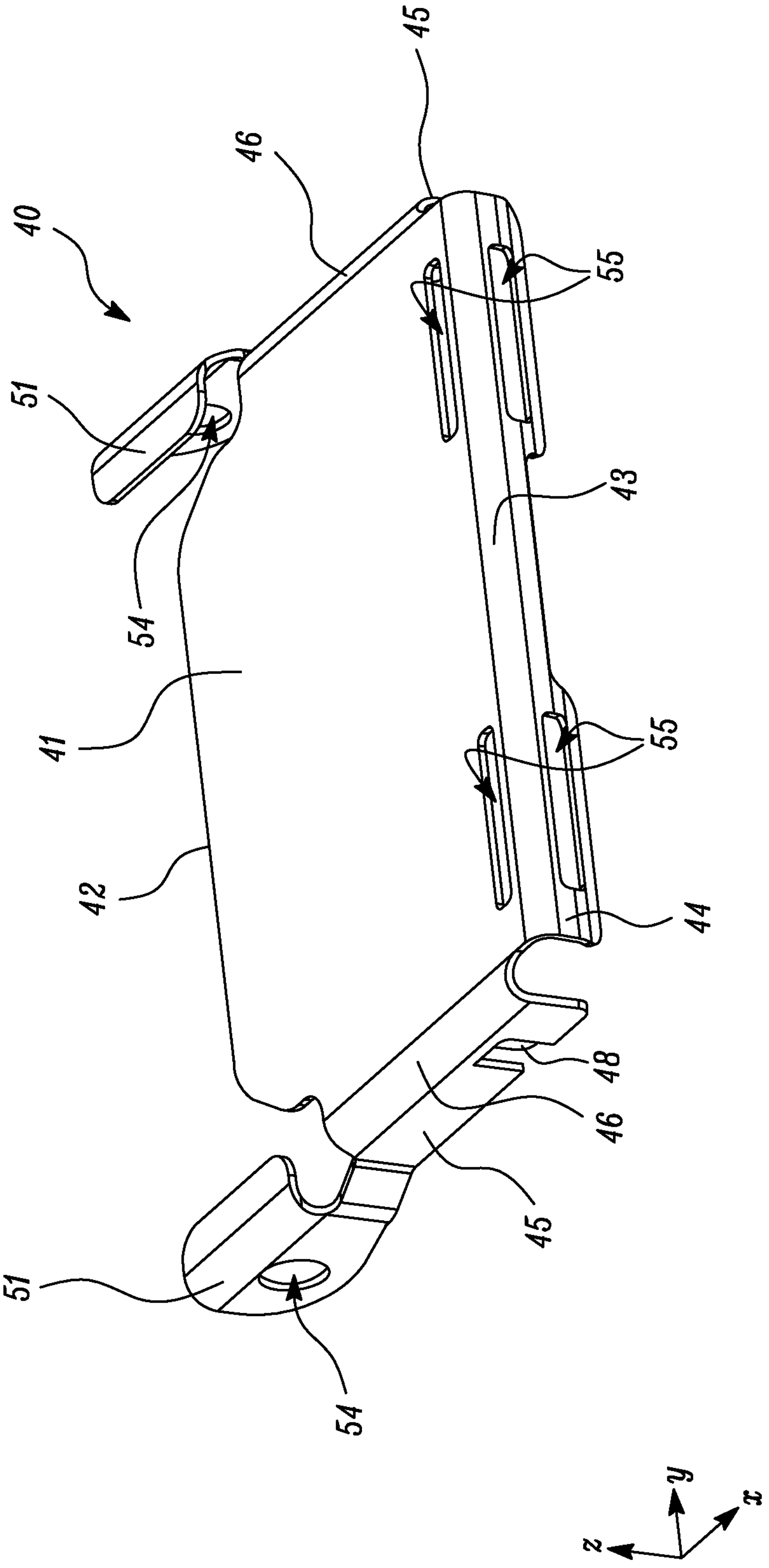
FIG. 3 is a schematic perspective view of an electrically conductive unitary shield of the connector assembly according to an embodiment of the present disclosure.

FIG. 3 illustrates a perspective view of the shield 40 according to an embodiment of the present disclosure. The shield 40 includes the top wall 41 extending between the back and front ends 42, 43 thereof. The front wall 44 extends downwardly from the front end 43 of the top wall 41. The opposing side walls 45 extend downwardly from the opposite side edges 46. The side wings 51 extend backwardly from the side walls 45. The shield 40 further includes the retention feature 48. In some embodiments, each side wall 45 of the shield 40 includes the retention feature 48. In some embodiments, the side wings 51 and the side walls 45 may lie in a same plane. In the illustrated embodiment of FIG. 3, the side wings 51 and the side walls 45 lie in separate planes substantially parallel to and spaced apart from each other. Specifically, the side wings 51 and the respective side walls 45 are spaced apart from each other along the y-axis. In some embodiments, each of the top wall 41, the front wall 44, and the opposing side walls 45 has a substantially planar configuration. In some other embodiments, one or more of the top wall 41, the front wall 44, and the opposing side walls 45 may have a curved configuration. In the illustrated embodiment of FIG. 3, the front wall 44 has a curved configuration. Further, at least a portion of each of the top wall 41 and the opposing side walls 45 may have a curved configuration. In some embodiments, the front end 43 of the top wall 41 may have curved configuration. For example, the front end 43 of the top wall 41 may be rounded. In some embodiments, the opposite side edges 46 of the top wall 41 may have a curved configuration. For example, the opposite side edges 46 of the top wall 41 may be rounded.

In some embodiments, the shield 40 may further include a plurality of openings 54. In some embodiments, the side walls 45 include the plurality of openings 54. In the illustrated embodiment of FIG. 3, each side wing 51 includes one opening 54. The plurality of openings 54 may be used to rotatably attach the housing 30 (shown in FIG. 2A) to the shield 40.

In some embodiments, the shield 40 may further include a plurality of through openings 55. In some embodiments, the top wall 41 includes at least one through opening 55 and the front wall 44 includes at least one through opening 55. In the illustrated embodiment of FIG. 3, the shield 40 includes four through openings 55. Specifically, the top wall 41 includes two through openings 55 and the front wall 44 includes two through openings 55. The plurality of through openings 55 may be used to rotatably attach the pull tab 80 (shown in FIG. 2A) to the shield 40.

Figure 4:
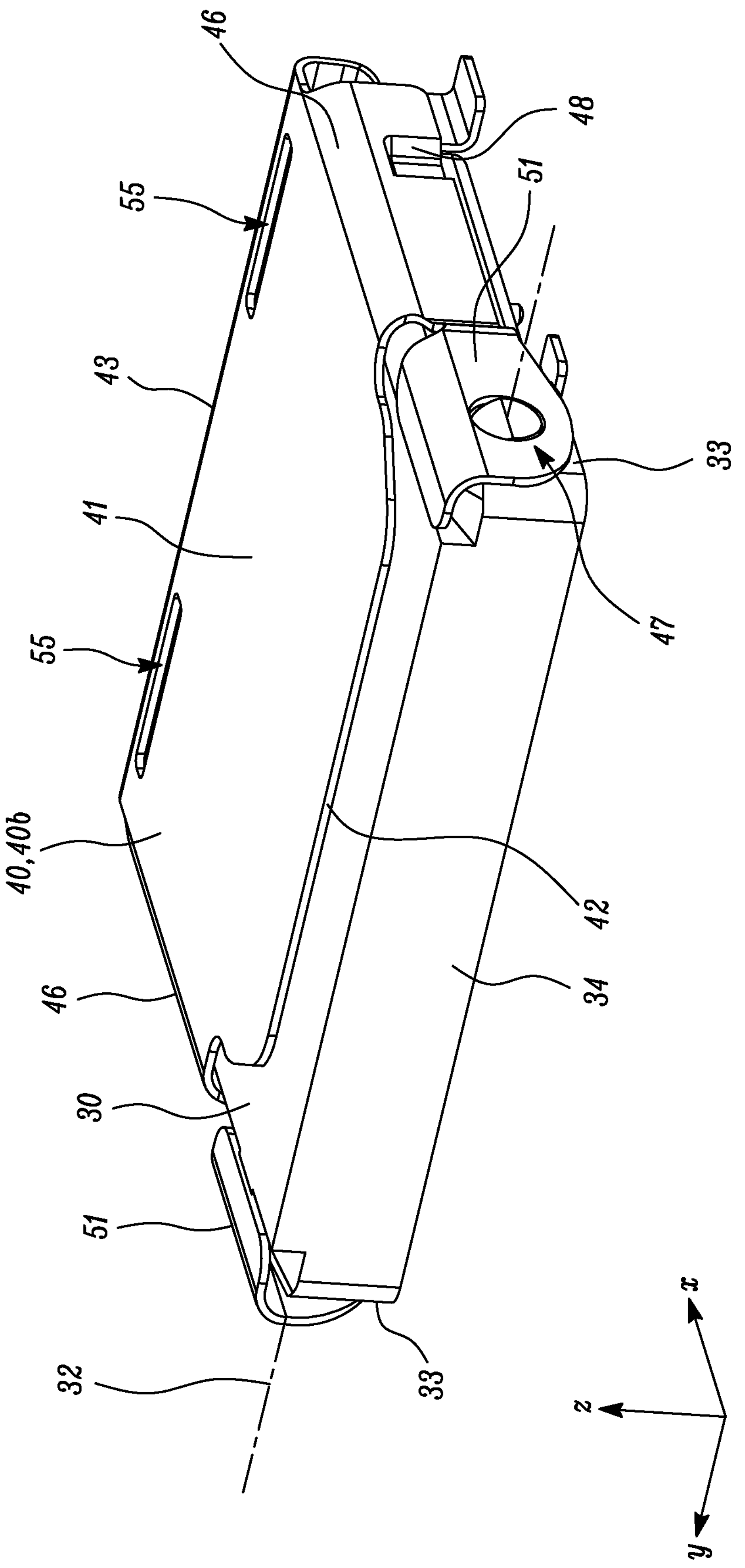
FIG. 4 is a schematic perspective view of an insulative housing and the electrically conductive unitary shield of the connector assembly according to an embodiment of the present disclosure.

FIG. 4 illustrates a perspective view of the housing 30 and the shield 40. In the illustrated embodiment of FIG. 4, the shield 40 is in the closed position 40*b*. The shield 40 is rotatably attached 47 to the housing 30 near the back end 42 of the top wall 41. The first axis 32 passes through the housing 30 and the side wings 51. Specifically, the first axis 32 passes through the housing 30 near the rear face 34 of the housing 30.

Figure 5B:
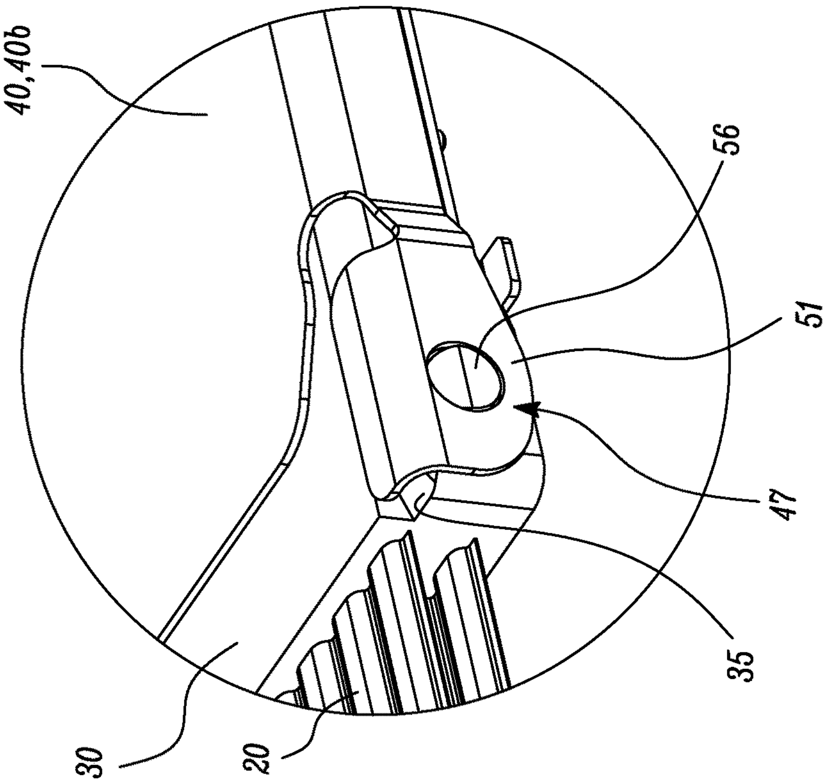
FIGS. 5A-5D are schematic enlarged views of the insulative housing and the electrically conductive unitary shield according to an embodiment of the present disclosure.
Figure 5A:
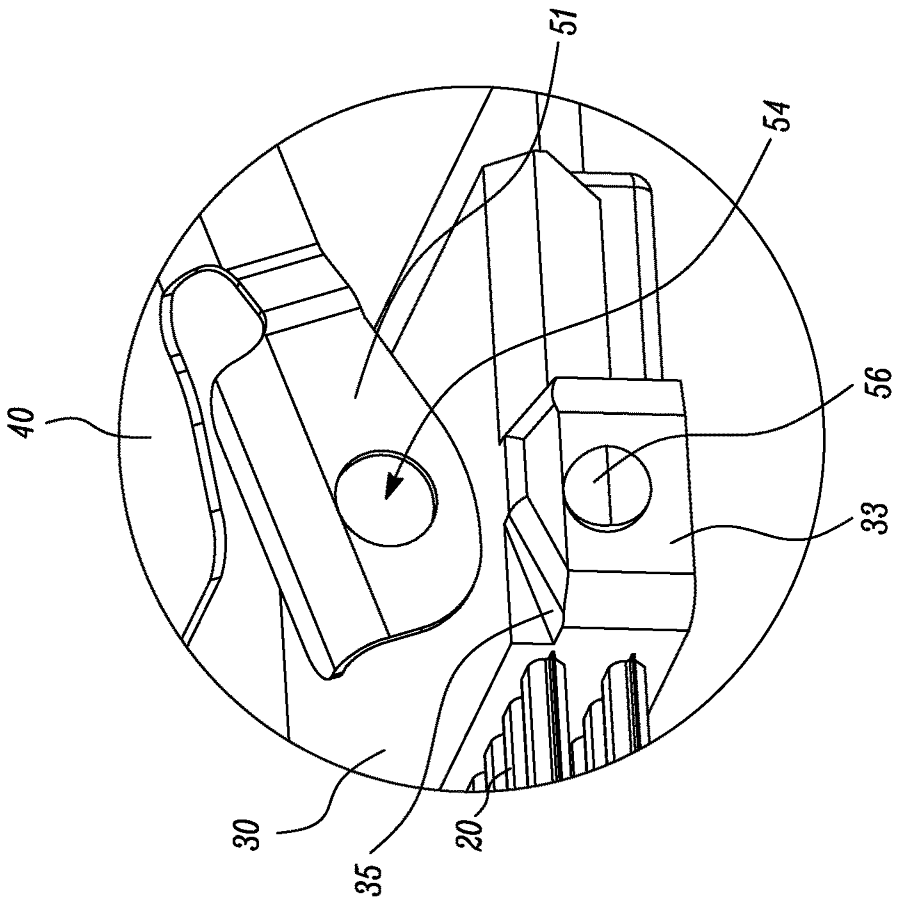
Figure 5D:
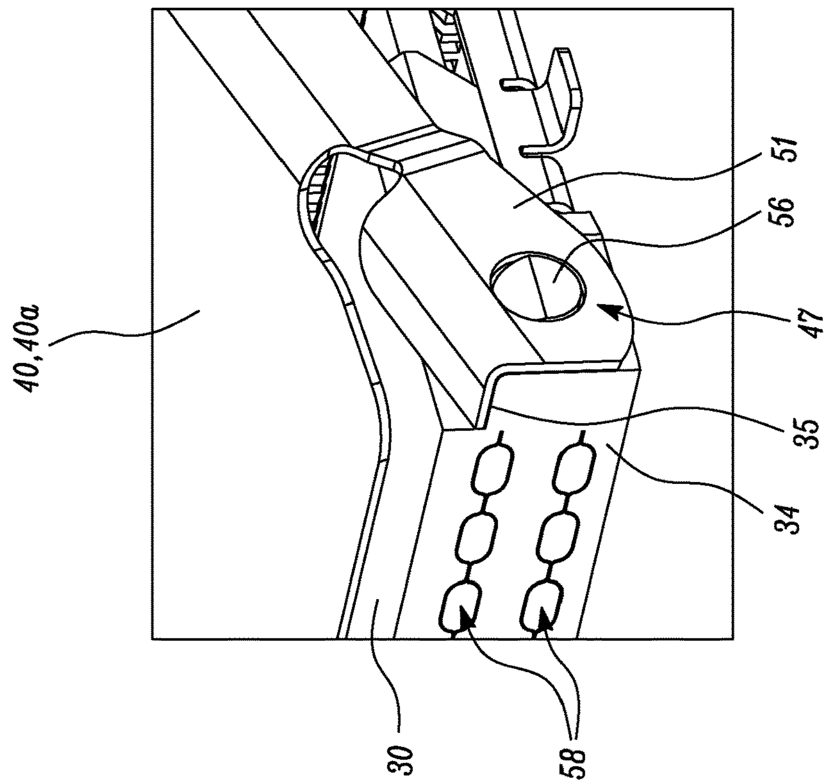
Figure 5C:
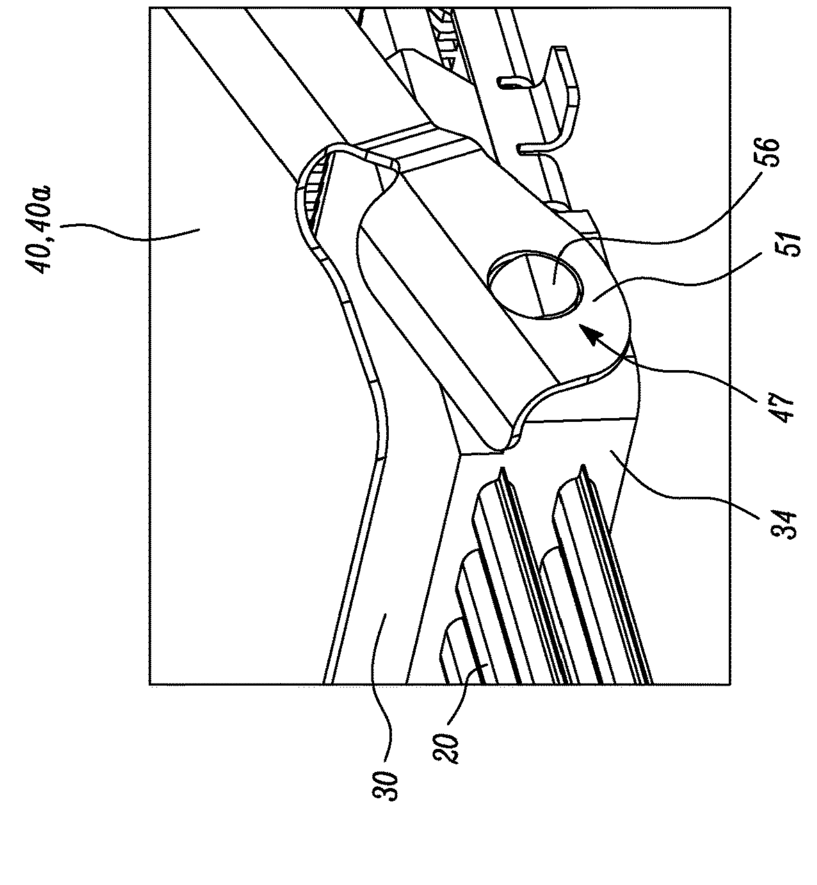

FIGS. 5A-5D illustrate enlarged views of the housing 30 and the shield 40. Specifically, FIG. 5A illustrates the housing 30 and the shield 40 detached from each other. FIG. 5A further illustrates the at least one cable 20. FIG. 5B illustrates the shield 40 rotatably attached 47 to the housing 30. FIG. 5B further illustrates the at least one cable 20. The shield is in the closed position 40*b* in FIG. 5B. FIG. 5C illustrates the shield 40 rotatably attached 47 to the housing 30. FIG. 5C further illustrates the at least one cable 20. The shield is in the open position 40*a* in FIG. 5C. FIG. 5D illustrates the shield 40 rotatably attached 47 to the housing 30. The at least one cable 20 is not shown in FIG. 5D. The shield is the open position 40*a*.

In some embodiments, the housing 30 further includes a stop portion 35 to limit a maximum rotation of the shield 40 from the closed position 40*b* to the open position 40*a* to less than about 60 degrees. In some embodiments, the stop portion 35 limits the maximum rotation of the shield 40 from the closed position 40*b* to the open position 40*a* to less than about 55 degrees, less than about 50 degrees, or less than about 45 degrees. In some embodiments, the stop portion 35 may include one or more inclined surfaces. In some other embodiments, the stop portion 35 may be curved. The maximum rotation of the shield 40 from the closed position 40*b* to the open position 40*a* may depend upon a geometry of the stop portion 35, such as an angle of inclination of the stop portion 35. In the illustrated embodiment of the FIGS. 5A-5C, the stop portion 35 is formed on each of the lateral sides 33 of the housing 30. In some other embodiments, the stop portion 35 may be formed at an inner surface of each of the opposing side wings 51 of the shield 40.

In some embodiments, the housing 30 further includes one or more protrusions 56. The shield 40 may engage with the one or more protrusions 56 to rotatably attach with the housing 30. In some cases, the housing 30 includes pair of protrusions 56. Each protrusion 56 may engage with a corresponding opening 54 of the shield 40 to rotatably attach the housing 30 to the shield 40. Specifically, each protrusion 56 may be at least partially received within the corresponding opening 54 to form the rotatable attachment 47 between the shield 40 and the housing 30. In some embodiments, the protrusions 56 are formed on the respective lateral sides 33 of the housing 30. In other words, each lateral side 33 of the housing 30 includes one protrusion 56.

As shown in FIG. 5D, the housing 30 further defines a plurality of cable openings 58 configured to at least partially receive the at least one cable 20 therein. In some cases, each cable opening 58 may at least partially receive a corresponding segment of the at least one cable 20 therein.

Figure 6A:
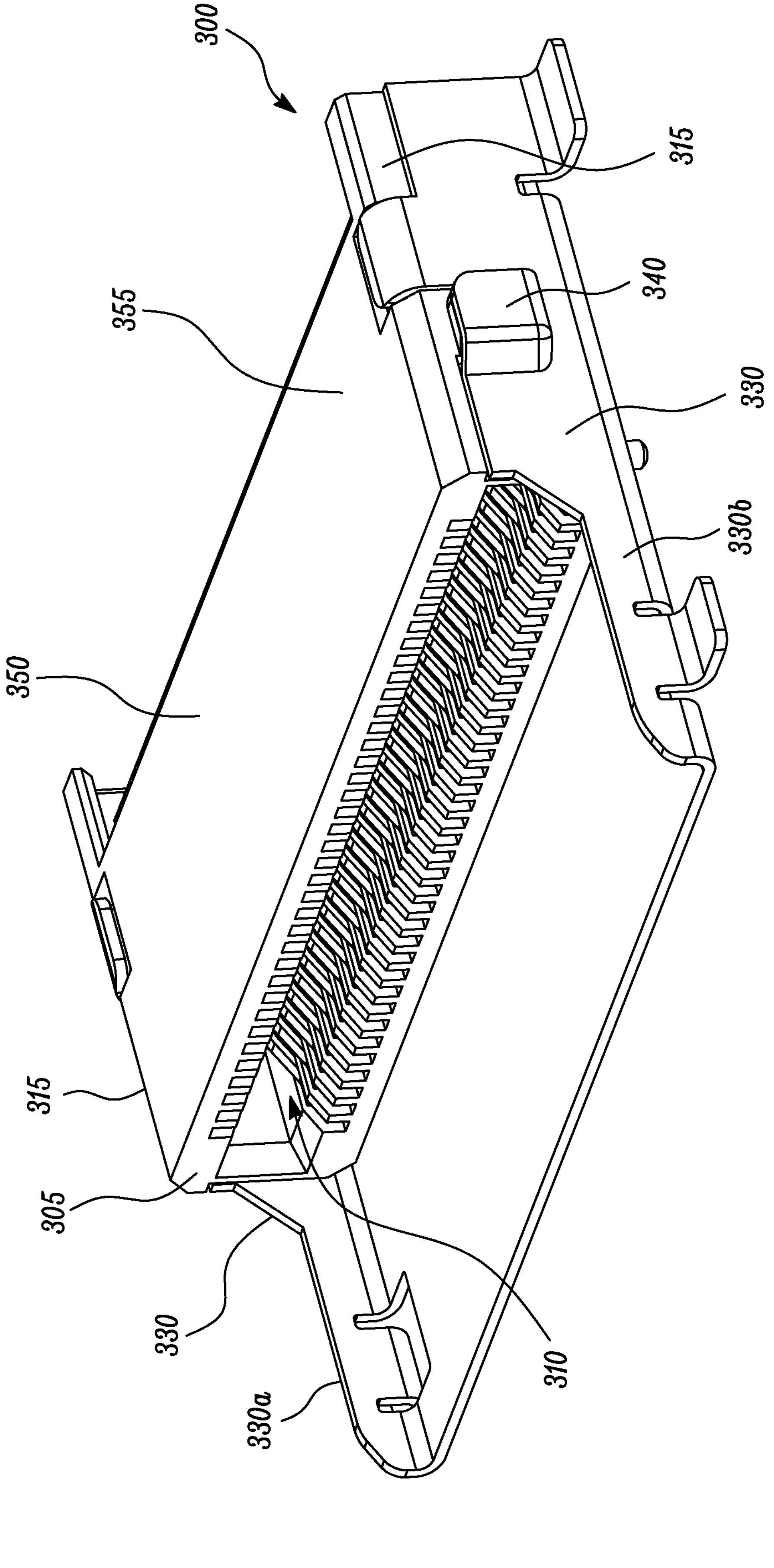
FIG. 6A is a schematic perspective view of a mating connector according to an embodiment of the present disclosure.
Figure 6B:
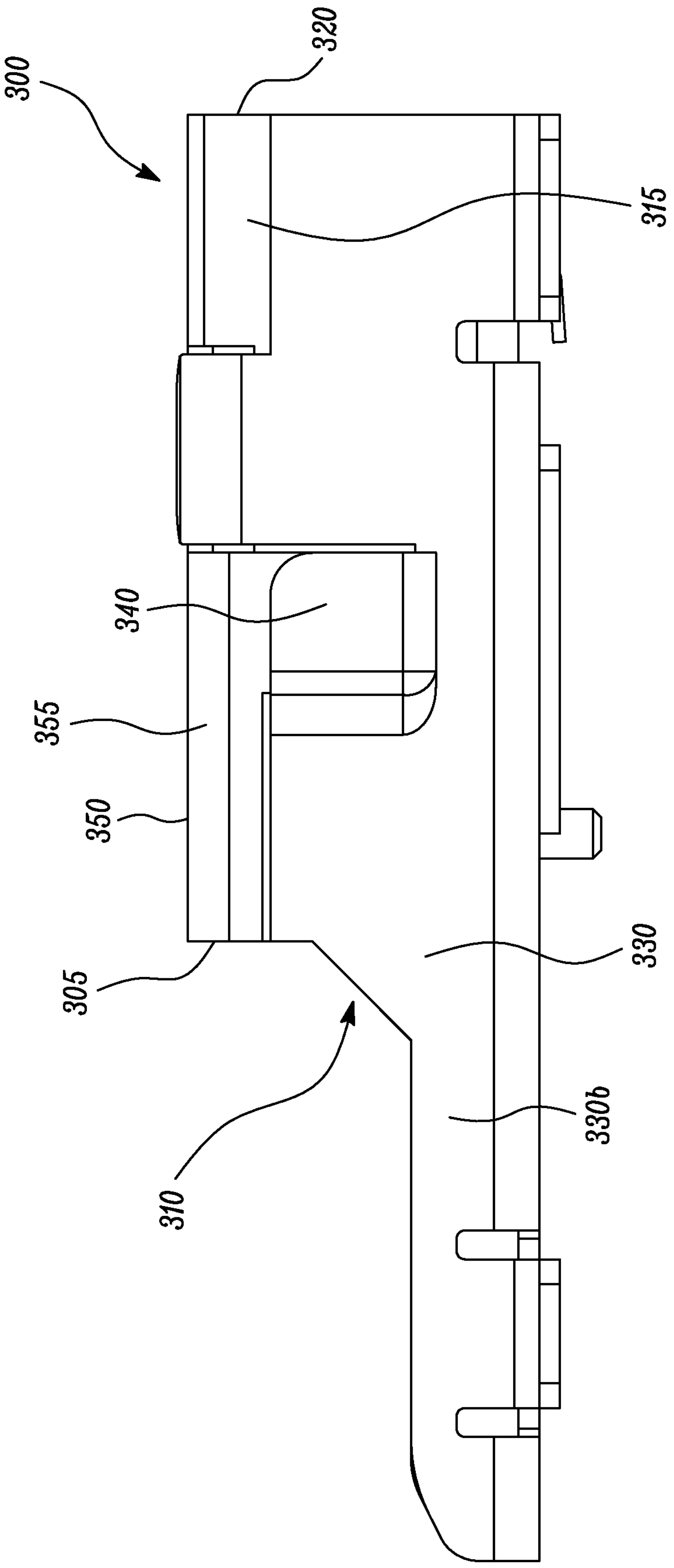
FIG. 6B is a schematic side view of the mating connector according to an embodiment of the present disclosure.

FIGS. 6A and 6B illustrate perspective and side views, respectively, of the mating connector 300, according to an embodiment of the present disclosure. The mating connector 300 further includes a mating insulative housing 355. The mating insulative housing 355 includes a top side 350. The mating insulative housing 355 includes a mating side 305 defining a front opening 310 therein, an opposite back side 320, and opposing lateral sides 315 (interchangeably referred to as "the opposing sides 315") extending between and connecting the mating and back sides 305, 320. The mating connector 300 further includes opposing lateral sides 330. In some embodiments, at least a portion of the opposing lateral sides 330 of the mating connector 300 may include opposing guide members 330*a*, 300*b*. The opposing guide members 330*a*, 330*b* define a channel therebetween. The opposing guide members 330*a*, 300*b* may act as alignment guides to facilitate the mating between the connector assembly 200 and the mating connector 300 along the mating direction. The opposing guide members 330*a*, 300*b* may further prevent misalignment between the connector assembly 200 and the mating connector 300, thereby preventing any accidental damage to the connector assembly 200 and the mating connector 300 due to misalignment.

The opposing lateral sides 330 include retention features 340. The retention features 48 of the shield 40 (shown in FIG. 3) may be configured to detachably interlock with a corresponding retention feature 340 of the mating connector 300. The mating end 14 of the circuit board 10 (shown in FIGS. 1A-1B) is configured to be inserted into the front opening 310 of the mating connector 300. Specifically, the mating end 14 of the circuit board 10 (shown in FIGS. 1A-1B) is configured to be inserted into the front opening 310 of the mating side 305 of the mating insulative housing 355.

Figure 7:
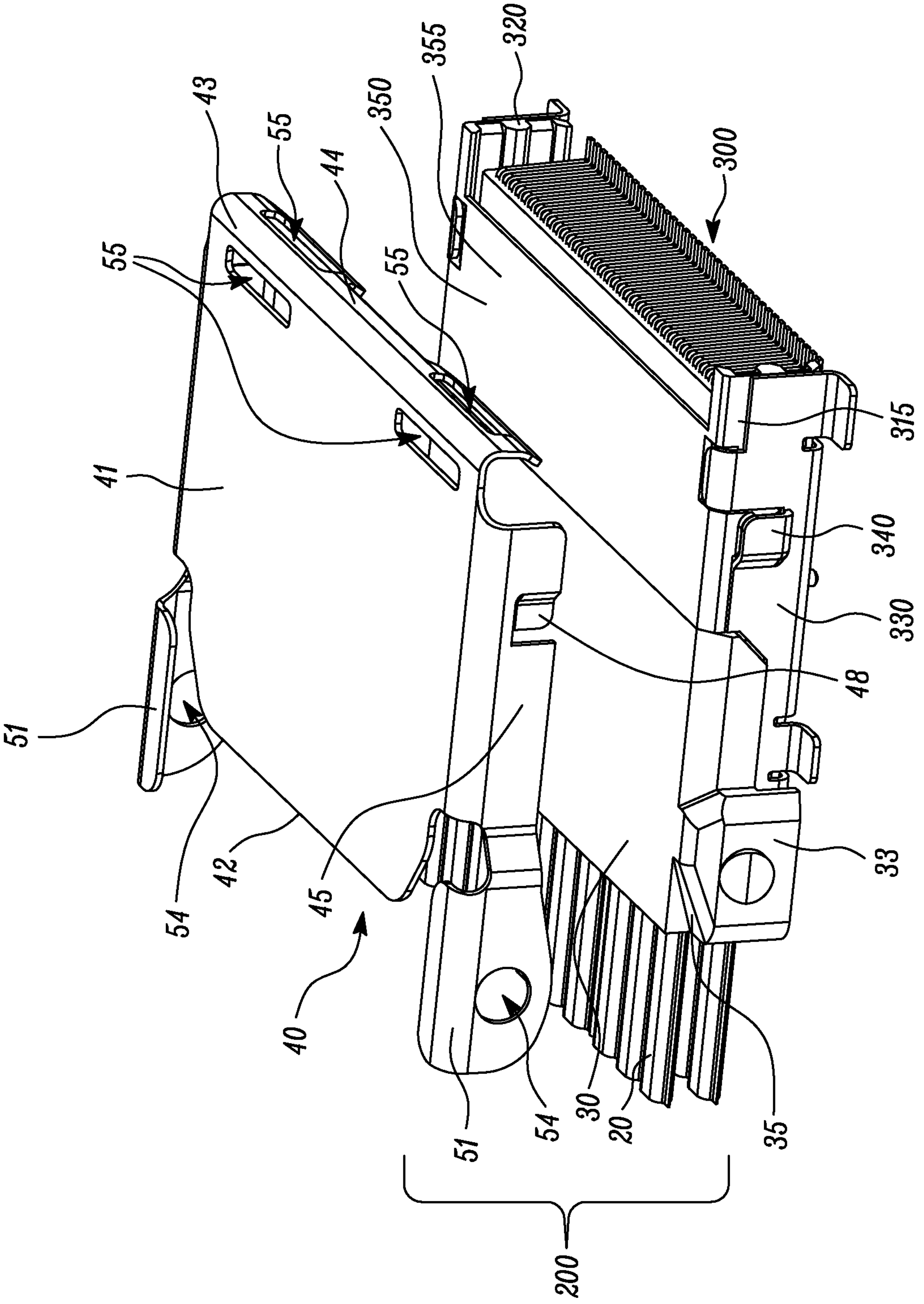
FIG. 7 is a schematic perspective view of the connector assembly and the electrically conductive unitary shield displaced from the connector assembly according to an embodiment of the present disclosure.

FIG. 7 illustrates the connector 200 and the mating connector 300. The shield 40 of the connector is shown displaced along the z-axis of the connector 200. As is apparent from FIG. 7, the shield 40 may substantially cover the entire top and lateral sides 350, 315, and at least a portion of the back side 320, of the mating insulative housing 355 upon a full mating between the connector 200 and the mating connector 300.

Figure 8A:
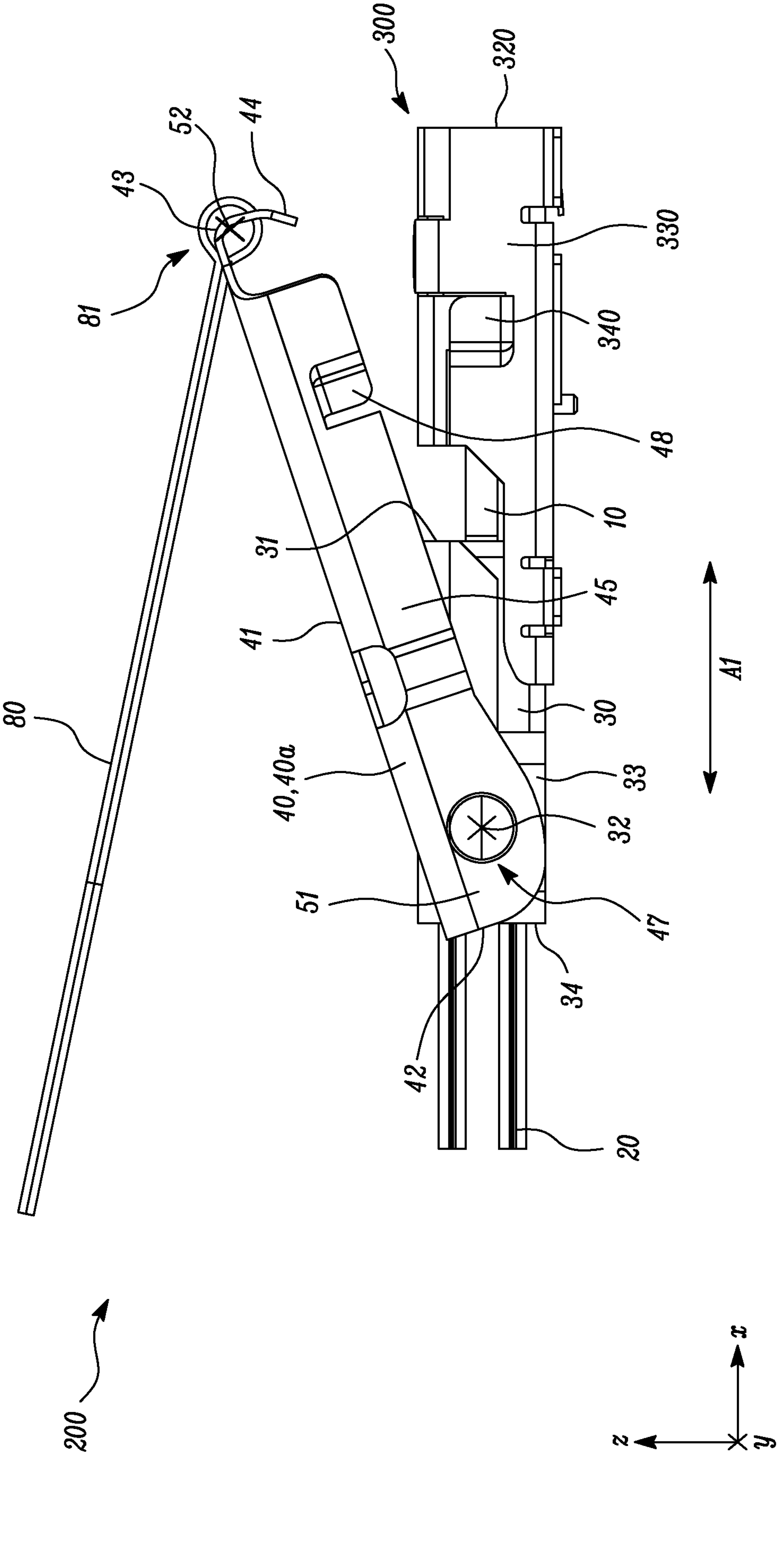
FIG. 8A is a side view of the connector assembly partially mated with the mating connector and the electrically conductive unitary shield in an open position according to an embodiment of the present disclosure.
Figure 8B:
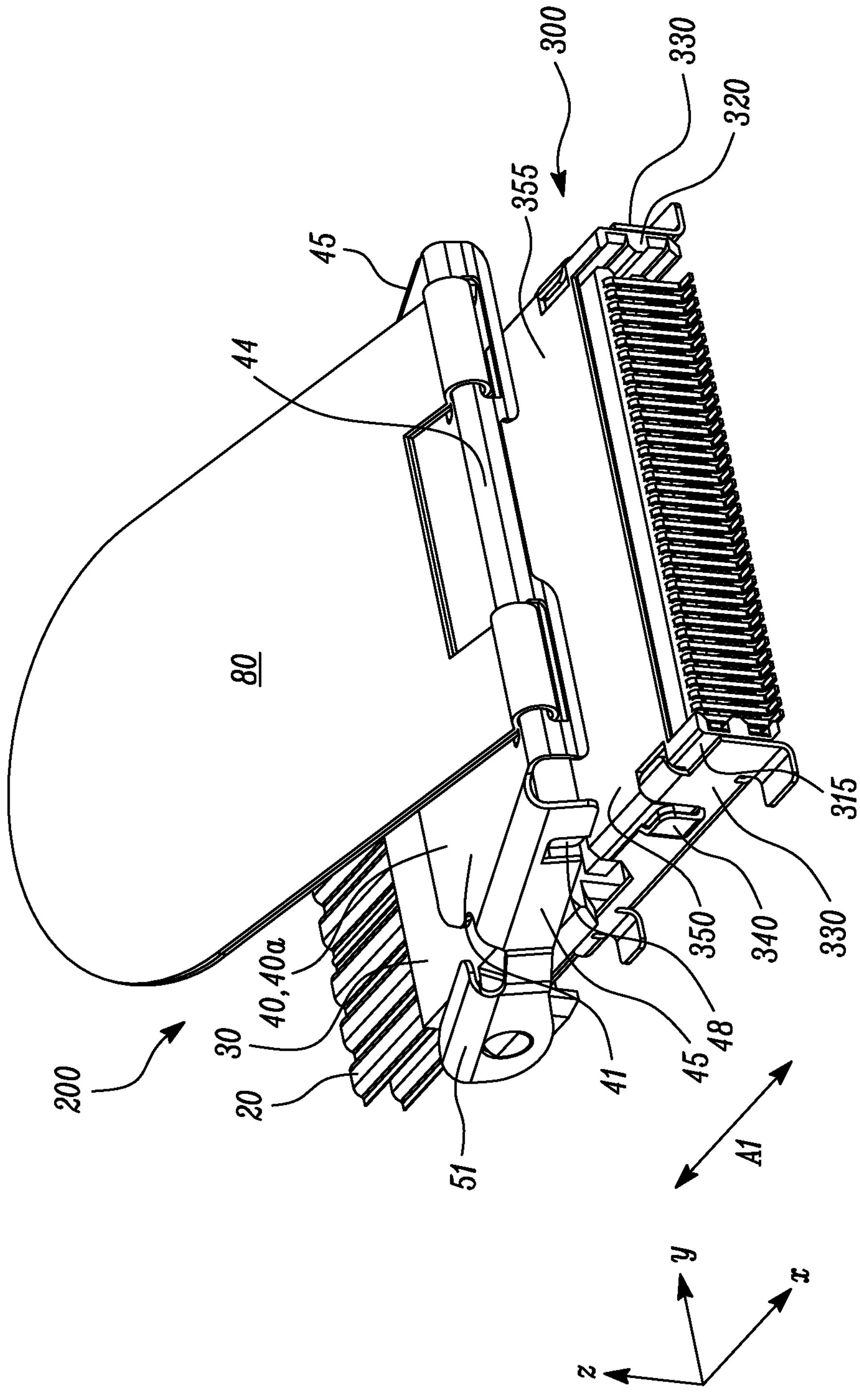
FIG. 8B is a schematic perspective view of the connector assembly partially mated with the mating connector and the electrically conductive unitary shield in the open position according to an embodiment of the present disclosure.

FIGS. 8A and 8B illustrate the connector assembly 200 partially mated with the mating connector 300. Specifically, FIG. 8A illustrates a side view of the connector assembly 200 partially mated with the mating connector 300, and FIG. 8B illustrates a perspective view of the connector assembly 200 partially mated with the mating connector 300. The shield 40 of the connector assembly 200 is in the open position 40*a* in FIGS. 8A-8B.

The connector assembly 200 is configured to mate with the mating connector 300 when the shield 40 is in the open position 40*a*. Specifically, the connector assembly 200 is configured to mate with the mating connector 300 when the shield 40 is in the open position 40*a* along the mating direction. The mating direction may be indicated by an arrow A1 in FIGS. 8A and 8B. In some embodiments, the connector assembly 200 may be configured to slidably mate with the mating connector 300, when the shield 40 is in the open position 40*a*, along the mating direction. As is apparent from FIGS. 8A and 8B, the retention feature 48 of the shield 40 is not engaged with the corresponding retention feature 340 of the mating connector 300 in the open position 40*a*.

Figure 9:
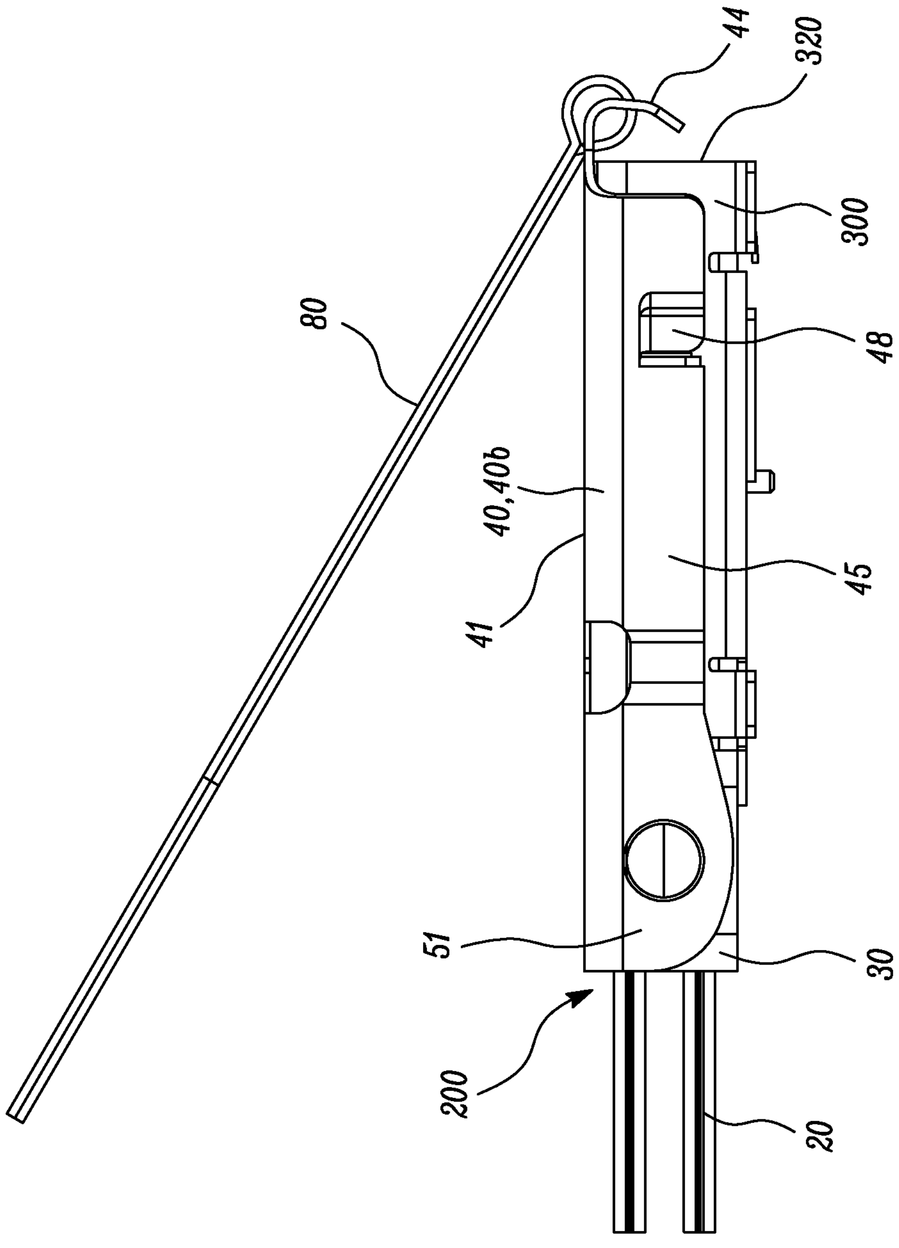
FIG. 9 is a schematic side view of the connector assembly fully mated with the mating connector and the electrically conductive unitary shield in a closed position according to an embodiment of the present disclosure.

FIG. 9 illustrates the connector assembly 200 fully mated with the mating connector 300. The shield 40 of the connector assembly 200 is in the closed position 40*b* in FIG. 9.

Referring to FIGS. 8A, 8B and 9, when the connector assembly 200 is fully mated with the mating connector 300, the shield 40 is configured to rotate from the open position 40*a* to the closed position 40*b*. In other words, upon the full mating between the connector 200 and the mating connector 300, the shield 40 is configured to rotate from the open position 40*a* to the closed position 40*b*.

The rotation of the shield 40 from the open position 40*a* to the closed position 40*b* results in the top wall 41 covering and shielding the housing 30, the circuit board 10, and the mating connector 300. The rotation of the shield 40 from the open position 40*a* to the closed position 40*b* further results in the front wall 44 being disposed at, and covering and shielding at least a portion of, the back side 320 of the mating connector 300. The rotation of the shield 40 from the open position 40*a* to the closed position 40*b* further results in the opposing side walls 45 being disposed at, and covering and shielding at least portions of, the opposing sides 315 of the mating connector 300. Specifically, the shield 40 is configured to rotate from the open position 40*a* to the closed position 40*b* so that the shield 40 covers substantially the entire top and lateral sides 350, 315, and at least a portion of the back side 320 of the mating insulative housing 355.

The rotation of the shield 40 from the open position 40*a* to the closed position 40*b* further results in the retention feature 48 of the shield 40 engaging the corresponding retention feature 340 of the mating connector 300 to prevent the connector assembly 200 from unmating from the mating connector 300. Specifically, the opposing retention features 48 of the shield 40 engage the corresponding retention features 340 of the mating connector 300 on the opposite lateral sides 330 of the mating connector 300 to prevent the connector 200 from unmating from the mating connector 300. The opposing retention features 48 of the shield 40 may removably engage the corresponding retention features 340 to facilitate mating and unmating of the connector assembly 200 and the mating connector 300. This may allow servicing and/or replacement of one or more components of the connector assembly 200.

Furthermore, when the connector assembly 200 is fully mated with the mating connector 300, the engagement of the retention feature 48 of the shield 40 with the retention feature 340 of the mating connector 300 prevents the two connectors 200, 300 from moving relative to each other along the mating direction. Therefore, the engagement of the retention feature 48 of the shield 40 with the retention feature 340 of the mating connector 300 may prevent accidental unmating of the mating connection.

Figure 10A:
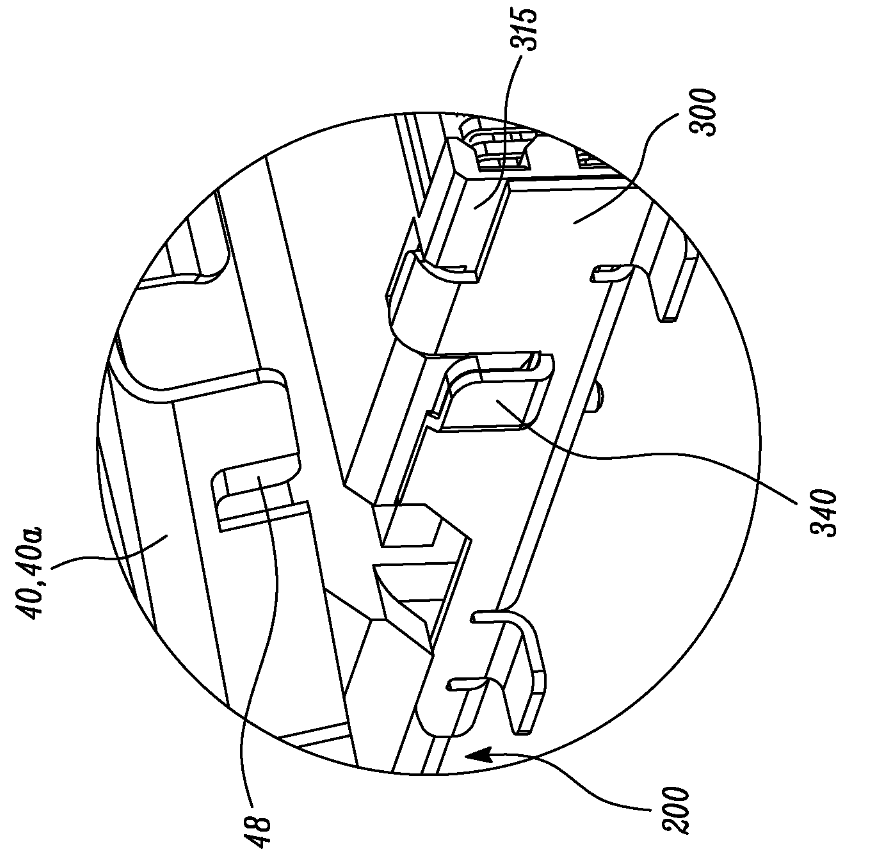
FIGS. 10A-10B are schematic enlarged side views of the connector assembly and the mating connector according to an embodiment of the present disclosure.
Figure 10B:
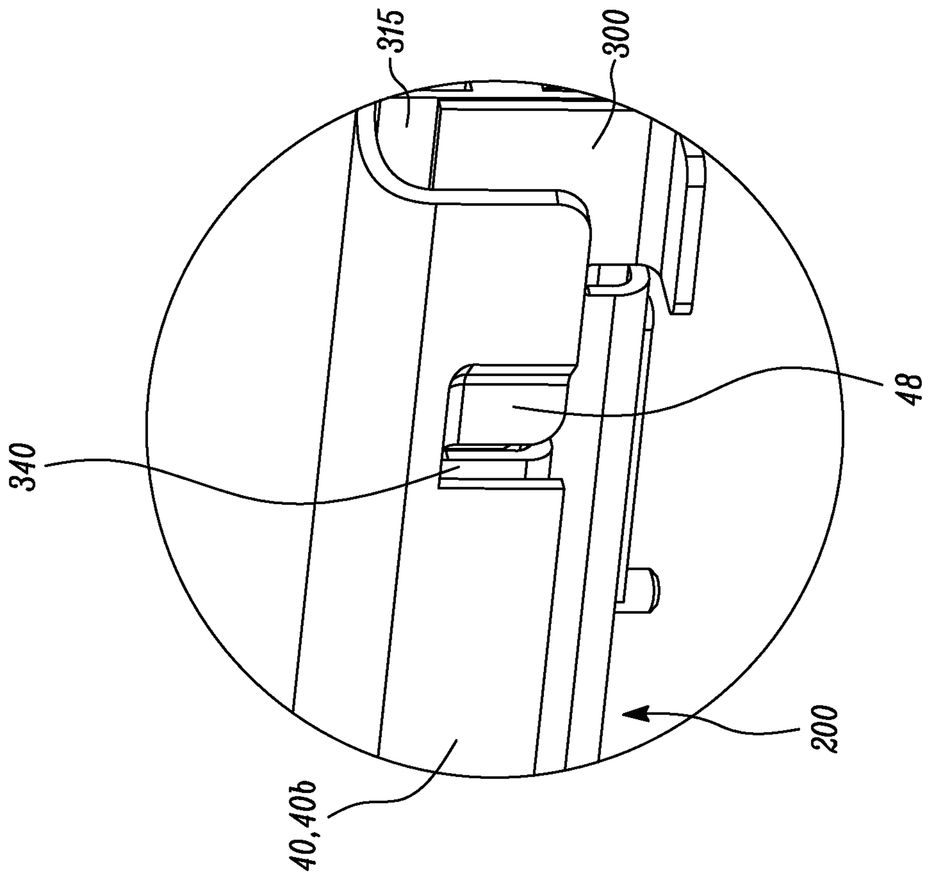

FIGS. 10A-10B illustrate enlarged side views of the connector assembly 200 and the mating connector 300, according to an embodiment of the present disclosure. Some components of the connector assembly 200 and the mating connector 300 have been omitted in FIGS. 10A-10B for the purpose of illustration.

FIG. 10A illustrates the connector assembly 200 and the mating connector 300. The shield 40 is in the open position 40*a*. The retention feature 48 of the shield 40 does not engage with the corresponding retention feature 340 of the mating connector 300 when the shield 40 is in the open position 40*a*. The connector assembly 200 is configured to mate with the mating connector 300 when the shield 40 is in the open position 40*a*.

FIG. 10B illustrates the connector assembly 200 and the mating connector 300. The shield 40 is in the closed position 40*b*. The retention feature 48 of the shield 40 engages with the corresponding retention feature 340 of the mating connector 300 in the open position 40*a*. In the illustrated embodiment of FIG. 10B, the retention feature 48 of the shield 40 and the corresponding retention feature 340 of the mating connector 300 interlock with each other. In some cases, the retention features 48 of the shield 40 and the corresponding retention features 340 may form a snap-fit engagement.

The engagement between the retention feature 48 of the shield 40 and the corresponding retention feature 340 prevents the connector assembly 200 from unmating from the mating connector 300. The engagement between the retention feature 48 of the shield 40 and the corresponding retention feature 340 may further prevent the two connectors 200, 300 from moving relative to each other along the mating direction. This may further prevent an undesirable relative movement between the connector assembly 200 and the mating connector 300 in the fully mated state and may ensure seamless connectivity between the connector assembly 200 and the mating connector 300.

Figure 11B:
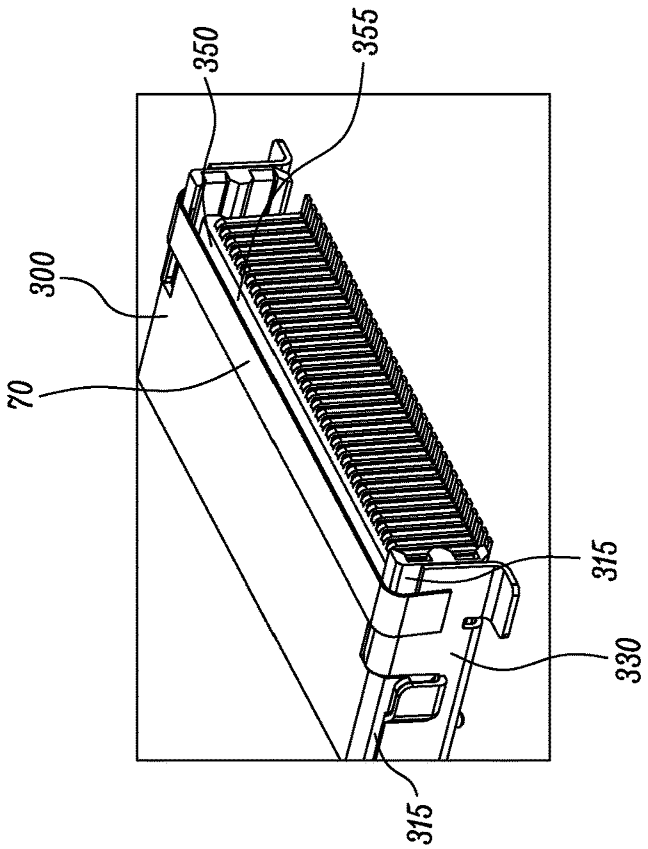
FIG. 11B is a schematic perspective view of a rear portion of the mating connector according to another embodiment of the present disclosure.
Figure 11A:
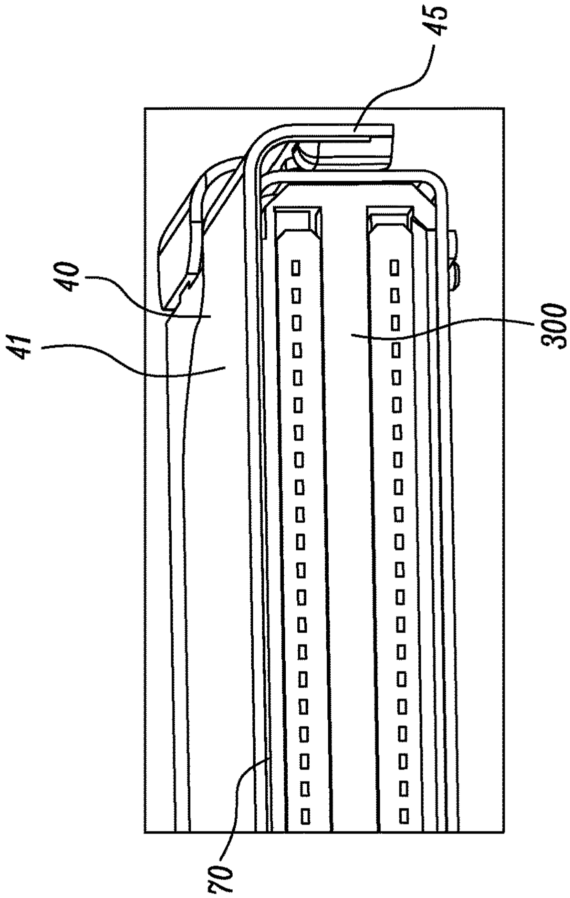
FIG. 11A is a schematic cross-sectional view of a rear portion of the mating connector according to an embodiment of the present disclosure.

FIGS. 11A-11B illustrate cross-sectional and perspective views, respectively, of a rear portion of the mating connector 300 according to an embodiment of the present disclosure. Some components of the connector assembly 200 and the mating connector 300 have been omitted in FIGS. 11A-11B for the purpose of illustration.

Referring to FIG. 11A, as discussed above, the electrically conductive strip 70 is bonded to the bottom surface 49 (shown in FIG. 2D) of the top wall 41 of the shield 40 near the front end 43 (shown in FIG. 2D) of the top wall 41. The conductive strip 70 extends laterally across the bottom surface 49 and further extends downwardly along the inside surface 50 (shown in FIG. 2D) of each of the opposing side walls 45, such that when the connector assembly 200 is fully mated with the mating connector 300, the conductive strip 70 covers and provides further shielding of the rear portion of the mating connector 300. Therefore, the rear portion of the mating connector 300 may be electromagnetically shielded. This may safeguard the rear portion of the mating connector 300 against electromagnetic interference from external devices.

Referring to FIG. 11B, the electrically conductive strip 70 may engage with at least a portion of the top side 350 of the mating insulative housing 355. The conductive strip 70 may further extend downwardly at least partially along the opposing lateral sides 330 of the mating connector 300. Further, the conductive strip 70 may further engage with at least a portion of each of the lateral sides 315 of the mating insulative housing 355. Therefore, the electrically conductive strip 70 may at least partially engage with the top side 350 and the lateral sides 315 of the mating insulative housing 355 at the rear portion of the mating connector 300. Thus, the conductive strip 70 may cover and provide shielding of the rear portion of the mating connector 300.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A connector assembly configured to mate with a mating connector along a mating direction and comprising:

a circuit board comprising a plurality of conductive front pads disposed on opposing major upper and lower surfaces of the circuit board at a mating end thereof, and a plurality of conductive rear pads disposed on at least one of the major upper and lower surfaces of the circuit board at a cable end thereof opposite the mating end, the rear pads electrically connected to the front pads;

at least one cable comprising a plurality of conductors, front ends of which terminate at the rear pads;

an insulative housing tightly overmolded around at least the cable end of the circuit board, the front ends of the conductors, and the rear pads, the mating end of the circuit board extending forwardly from a mating face of the housing along the mating direction and configured to be inserted into a front opening of the mating connector;

an electrically conductive unitary shield comprising a top wall extending between back and front ends thereof, a front wall extending downwardly from the front end of the top wall, and opposing side walls extending downwardly from opposite side edges of the top wall, the shield rotatably attached to the housing near the back end of the top wall and configured to rotate about a laterally oriented first axis that passes through the housing behind the circuit board, between an open position and a closed position; and a pull tab rotatably attached to the shield near the front end of top wall and configured to rotate about a laterally oriented second axis substantially parallel to the first axis, wherein, the connector assembly is configured to mate with the mating connector when the shield is in the open position, and wherein when the connector assembly is fully mated with the mating connector, the shield is configured to rotate from the open position to the closed position, resulting in:

the top wall covering and shielding the housing, the circuit board, and the mating connector;

the front wall being disposed at, and covering and shielding at least a portion of, a back side of the mating connector;

the opposing side walls being disposed at, and covering and shielding at least portions of, opposing sides of the mating connector; and a retention feature of the shield engaging a corresponding retention feature of the mating connector to prevent the connector assembly from unmating from the mating connector.

2. The connector assembly of claim 1, wherein when the connector assembly is fully mated with the mating connector, the engagement of the retention feature of the shield with the retention feature of the mating connector prevents the two connectors from moving relative to each other along the mating direction.

3. The connector assembly of claim 1 further comprising an electrically conductive strip bonded to a bottom surface of the top wall of the shield near the front end of the top wall, the conductive strip extending laterally across the bottom surface and further extending downwardly along an inside surface of each of the opposing side walls, such that when the connector assembly is fully mated with the mating connector, the conductive strip covers and provides further shielding of a rear portion of the mating connector.

4. The connector assembly of claim 1, wherein the insulative housing comprises a stop portion to limit a maximum rotation of the shield from the closed position to the open position to less than about 60 degrees.

* * * * *